United States Patent [19]

Jureit et al.

[11] 4,297,048
[45] Oct. 27, 1981

[54] FASTENERS FOR JOINING ANGULARLY RELATED WOODEN MEMBERS

[75] Inventors: John C. Jureit, Coral Gables; Henry R. Greenley, Fort Lauderdale, both of Fla.

[73] Assignee: Automated Building Components, Inc., Miami, Fla.

[21] Appl. No.: 23,186

[22] Filed: Mar. 23, 1979

Related U.S. Application Data

[63] Continuation of Ser. No. 748,679, Dec. 8, 1976, abandoned.

[51] Int. Cl.³ .............................................. F16B 7/00
[52] U.S. Cl. .................................... 403/189; 403/205; 403/217; 403/231; 441/466
[58] Field of Search ............... 403/188, 189, 205, 217, 403/219, 231, 287, 382, 406; 85/11, 13

[56] References Cited

U.S. PATENT DOCUMENTS

| | | | |
|---|---|---|---|
| 2,396,030 | 3/1946 | Terry | 85/13 X |
| 2,973,175 | 2/1961 | Appleton | 85/13 UX |
| 3,305,252 | 2/1967 | Jureit | 85/13 X |
| 3,416,821 | 12/1968 | Benno | 85/13 X |
| 3,828,514 | 8/1974 | Jureit | 85/11 X |

FOREIGN PATENT DOCUMENTS

1295047 11/1972 United Kingdom .................... 85/13

Primary Examiner—Werner H. Schroeder
Attorney, Agent, or Firm—LeBlanc, Nolan, Shur & Nies

[57] ABSTRACT

The fastener comprises a sheet metal plate bent to provide two or more angularly related planar plate portions. One of the plate portions has a plurality of elongated nail-like teeth struck therefrom for embedment into one of the joint members. The other plate portion or portions have a plurality of elongated teeth each comprised of angularly related shank and tip portions. The shank portions extend from and form an included angle with such other plate portion. The tip portions extend from the shank portions in a direction toward the plate portion from which the tooth is struck and are poised for insertion through the respective slots for embedment into another of the joint members. Inside and outside connectors are formed depending upon the orientation of the teeth in the plate portions.

15 Claims, 22 Drawing Figures

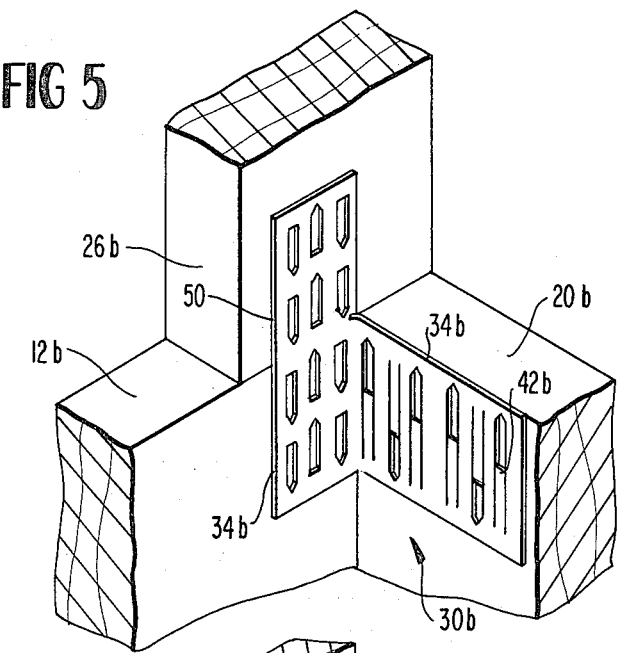
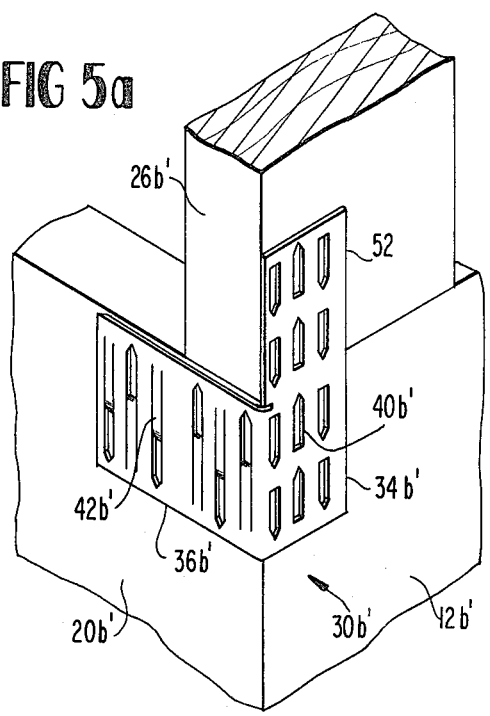
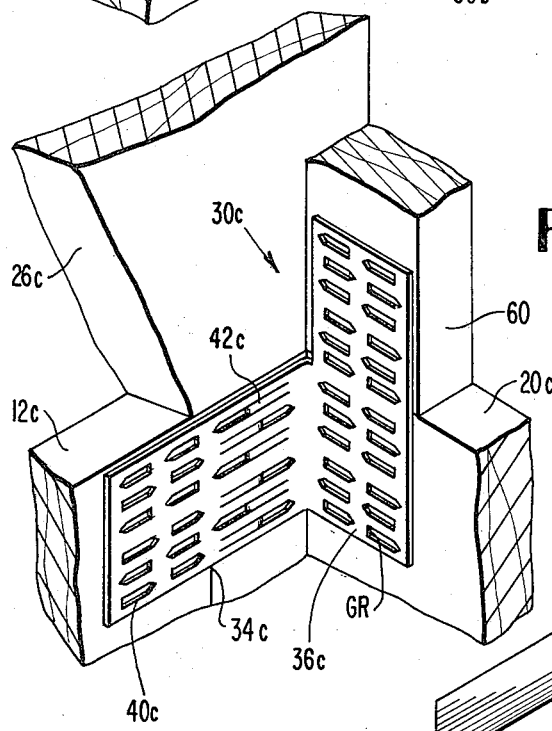
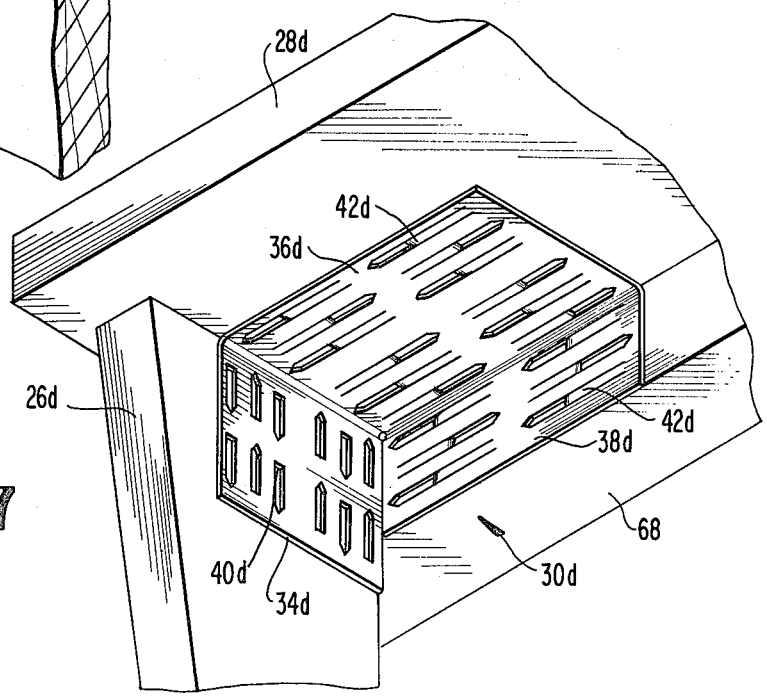

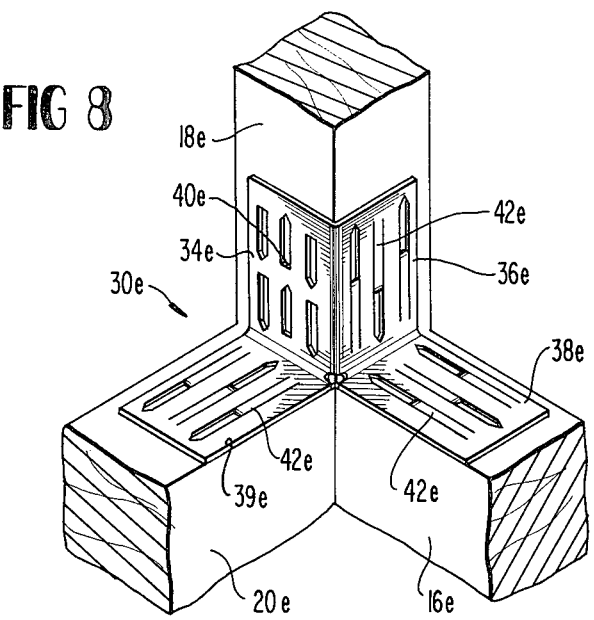
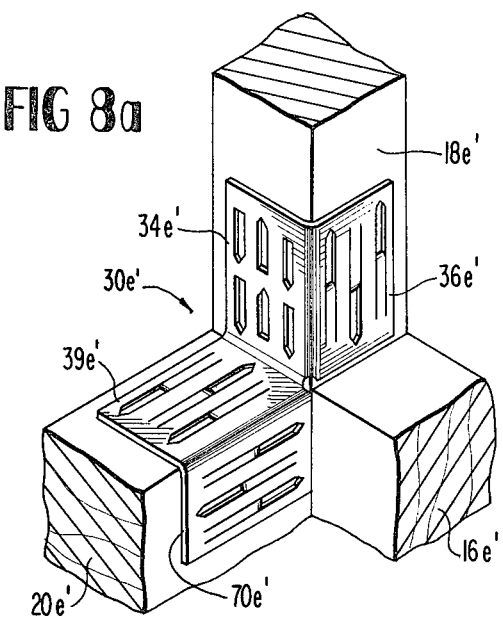
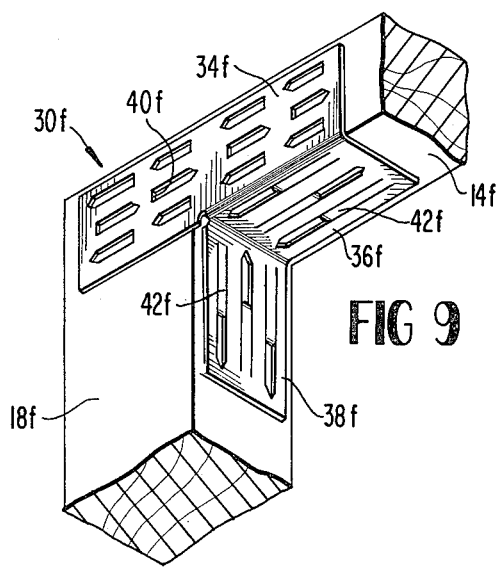
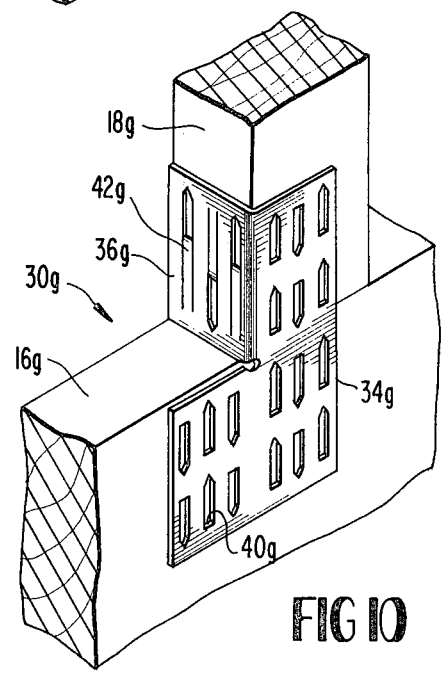
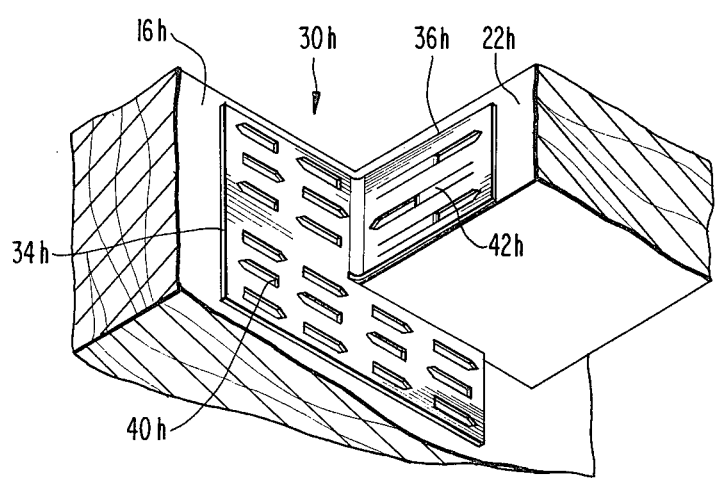

FASTENERS FOR JOINING ANGULARLY RELATED WOODEN MEMBERS

This is a continuation of application Ser. No. 748,679 filed Dec. 8, 1976.

BACKGROUND OF THE INVENTION

The present invention relates to fasteners for connecting wooden members one to the other and particularly relates to fasteners for joining angularly related wooden members, for example the members forming a frame for a furniture piece, and to the joints formed thereby.

Various types and configurations of fasteners for joining wooden members one to the other have been proposed and utilized in the past. For example, in U.S. Pat. No. 3,427,055 of common assignee herewith, there is disclosed a corner fastener bent to provide planar plate portions each containing teeth struck therefrom for embedment into the members forming the joint. The teeth in that patent are configured to progressively decrease in length from the base of the plate in a direction toward the fold or crease. That configuration of teeth prevents the teeth from distorting the fastener when applied to the members of the joint. One significant disadvantage of this fastener, however, is the relatively thin gauge metal from which it is formed and which is necessary to facilitate bending of the plate to embed the teeth of both plate portions into the members of the joint. In joints used in the furniture construction industry, however, there is a requirement for a very rigid strong structural joint requiring much heavier gauge metal. Another connector plate or fastener for joining angularly related members is disclosed in U.S. Pat. No. 3,305,252 of common assignee herewith. The plate of that patent is bent and cut to form planar plate portions having teeth struck therefrom to extend in a common direction whereby the plate is driven toward the corner with the teeth of each plate portion being simultaneously embedded into the members of the joint. Driving a plate of this type is particularly difficult in hard-to-get-at joints, for example corners in a furniture construction. Also, the three members of the joint are joined one to the other simultaneously. This precludes use of this type of fastener where it is desired to first join members in a common plane one to the other and subsequently secure the joined members to one or more additional angularly related members as in a furniture construction.

Other types of fasteners or connector plates have been proposed and utilized but none, to applicant's knowledge, are particularly adaptable for use in forming joints between angularly related wooden members, i.e. hard-to-get-at inside and outside corners. There is a particular need in the furniture construction industry to replace the joint connecting elements with a connector plate which can be readily applied even in the hard-to-get-at corners.

SUMMARY OF THE INVENTION

The present invention minimizes and/or eliminates the above-described and other problems associated with prior fasteners for joining angularly related members and provides a novel and improved fastener for joining angularly related members having various advantages in construction and mode of application in comparison with such prior fasteners. Particularly, the present invention provides a fastener specifically adapted to connect angularly related members, whether on the inside or outside of the joint formed by the members, and more specifically adapted for use in furniture construction. The present invention provides a flat sheet metal plate bent to form two or more angularly related planar plate portions. Each plate portion has teeth struck therefrom for embedment into the members of the joint. Two different types of teeth are utilized in the present invention to effect the joint. One type of teeth comprises elongated nail-like teeth struck from a plate portion to project normally thereto whereby such teeth are directly embedded into one or more members of the joint. This type of teeth in hereinafter referred to as the straight teeth. The other type of teeth utilized in the fastener hereof comprise a plurality of elongated teeth struck from one or more plate portions to form angularly related shank and tip parts which project to one side of the plate portion. Particularly, the shank is struck to extend from the plate portion to form an included angle therewith while the tip is bent over and poised for insertion through the slot left by the struck tooth. This second type of tooth is hereinafter referred to as a bent tooth. In this fashion, it will be appreciated that the plate face on the side thereof remote from the bent teeth presents a flat face for butting against a joint member prior to driving the tip parts of the teeth through the slots into the joint member.

According to the present invention, the first described type of teeth, i.e., the straight teeth, are formed only in those one or more plate portions which lie in a common plane. These teeth are particularly adaptable for embedment by machine processes which normally provide for embedment of plates of this type in a single plane. Thus, an entire frame extending in a single plane can be fabricated by embedding the straight teeth of the coplanar plate portions into the joints formed by the coplanar frame members with the other angularly related plate portions or portions projecting from the frame for subsequent securement to the other members of the joint utilizing the bent teeth. It will be appreciated that conventional connector plates, for example the type disclosed in U.S. Pat. No. 2,877,520, can be utilized to join the coplanar frame members at locations in the frame where additional joint members angularly related to the frame are not applied. Thus, combinations of connector plates and the fasteners hereof can be utilized where applicable to form a three dimensional wooden frame.

A principal advantage of the fastener hereof resides in the fact that the joint members can be located flush against the face of the plate portion(s) containing the bent teeth of the side thereof remote from such teeth prior to securement thereof in the joint. This permits accurate alignment of the joint members in their final disposition prior to final securement. A further advantage of the fastener hereof is that the force for embedding the bent teeth can be applied directly against the joint member rather than directed at an angle thereto or obliquely of the joint.

The present invention provides numerous variations of fastener configurations. Basically, however, the fastener variations reside in the number of plate portions which, in turn, depends upon the particular joint to which the plate is applied and also whether the plate is applied inside or outside of the joint. Generally, one of the plate portions is provided with straight teeth such that the plate can be applied to a joint member or frame by standard machine processes such as heavy duty presses. The bent teeth provided in the remaining plate portion or portions of the fastener are then embedded into one or more of the other joint members by a suitable tool. Additionally, the plate portions need not be dimensionally alike. That is, discrete plate portions of the fasteners hereof may be longer or wider than other plate portions of the same fastener, i.e., may extend beyond the edges of adjacent plate portions, all dependent upon the requirements of the particular joint involved. For example, a fastener may include a first elongated plate portion provided with straight teeth for joining two or more members in a like plane one to the other and a second plate portion bent from the elongated portion for joining a still third member to the joint. This latter plate portion contains the bent teeth and may be dimensionally different, i.e., decreased in width in comparison with the length of the first mentioned plate portion.

Accordingly, it is a primary object of the present invention to provide a novel and improved fastener for joining angularly related wooden members.

It is another object of the present invention to provide a novel and improved fastener for joining angularly related wooden members and which fastener is readily and easily secured to the members of the joint.

It is still another object of the present invention to provide a novel and improved fastener for joining angularly related wooden members wherein the fastener is configured for application to inside or outside corners of a joint.

It is a further object of the present invention to provide a novel and improved fastener for joining angularly related members having two different types of integrally struck teeth for application in two different planes of the joint member whereby the teeth of one plate portion can be embedded into the joint member by production line processes such as heavy duty presses and the teeth of the other plate portion embedded into the other joint member by other suitable tools upon final assembly of the joint.

It is a still further object of the present invention to provide a novel and improved fastener for joining angularly related wooden members particularly useful in the construction of furniture frames.

It is a related object of the present invention to provide a novel and improved joint between angularly related wooden members.

These and further objects and advantages of the present invention will become more apparent upon reference to the following specification, claims and appended drawings.

BRIEF DESCRIPTION OF THE DRAWINGS

FIGS. 5 and 5a are respective inside and outside fragmentary perspective views of a like joint and illustrating inside and outside fasteners applied to the joint;

FIG. 6 is a fragmentary perspective view of the inside of a joint illustrating another form of fastener hereof;

FIG. 7 is a fragmentary perspective view of a joint illustrating a further form of fastener hereof;

FIGS. 8 and 8a are fragmentary perspective views of a pair of joints with respective embodiments of the fastener hereof applied thereto;

FIGS. 9-15 are fragmentary perspective views of the various joints of the frame illustrated in FIG. 1 with the joint members being connected by fasteners constructed in accordance with the present invention, the joints of FIGS. 9-15 being noted in FIG. 1 as FIGS. 9-15 respectively;

DESCRIPTION OF THE PREFERRED EMBODIMENTS

Figure 1:
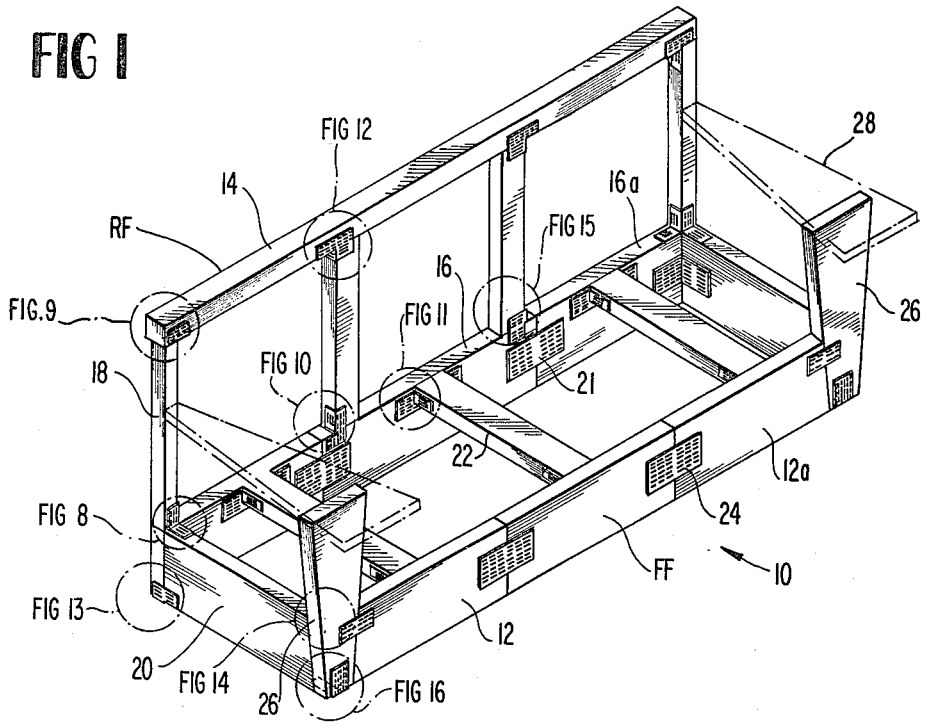
FIG. 1 is a perspective view of an exemplary furniture frame illustrating various types of fasteners constructed in accordance with the present invention.

Referring now to the drawings, particularly to FIG. 1, there is illustrated a furniture frame, generally indicated 10, comprised of a front frame FF including a rail 12 which spans the entire length of the furniture piece, and a rear furniture frame RF including upper and lower rear rails 14 and 16, respectively, which likewise span the entire length of the furniture piece and are joined one to the other by a plurality of spaced uprights 18. Side rails 20 join like ends of the front and lower rear rails 12 and 16 one to the other. Stretchers 22 are spaced longitudinally along the length of the frame and extend between the front and lower rear rails.

Figure 2:
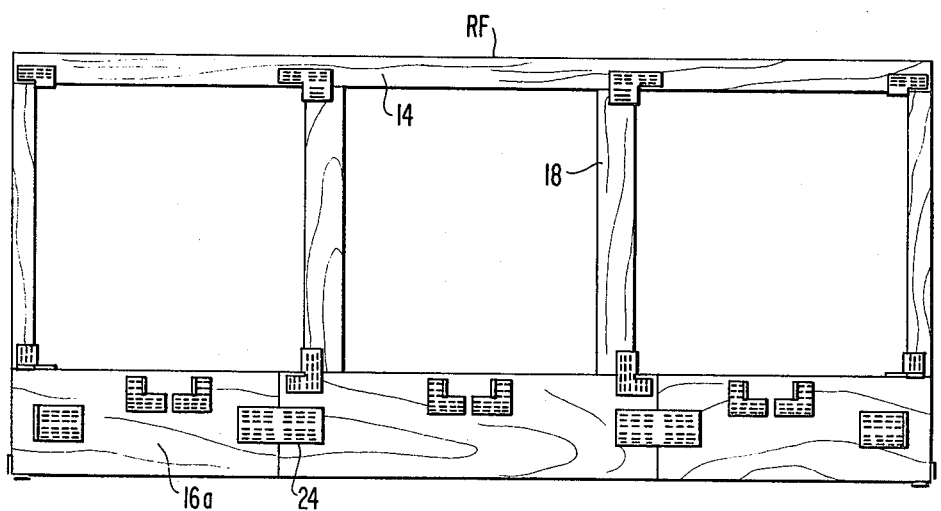
FIG. 2 is a front elevational view of the back frame portion of the furniture frame illustrated in FIG. 1.
Figure 3:
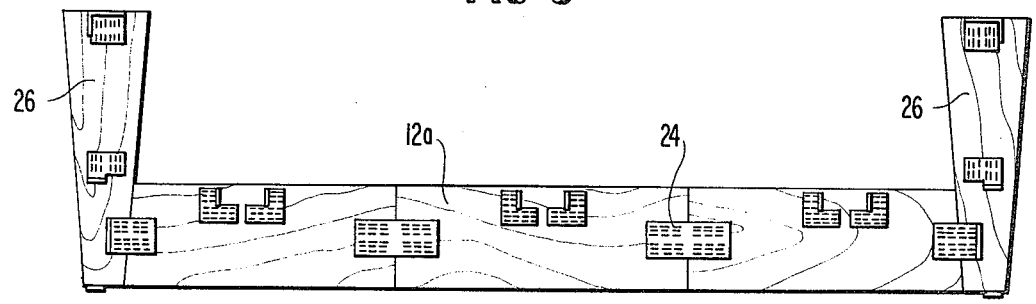
FIG. 3 is a rear elevational view of the front frame portion of the frame illustrated in FIG. 1.

Referring to FIGS. 2 and 3, each of the front and lower rear rails 12 and 16, respectively, may be comprised of a plurality of discrete lengths of wooden members, for example the members 16a of lower rear rail 16 and members 12a of front rail 12. Each of these discrete members 12a and 16a may be joined endwise one to the other as applicable to form the completed rail by by connector plates 24 of the type having a plurality of elongated nail-like teeth struck from a sheet metal plate to project from one side thereof for embedment into the members of the joint. The plates 24 are applied on opposite sides of the members of the various joints. By utilizing discrete lengths of wood joined endwise one to the other for the front and rear rails, short wooden members otherwise unsuitable for use in furniture construction can be utilized thereby minimizing the quantity of scrap wood left and lowering the cost of the furniture piece. Connector plates 24 may be of the type described and illustrated in my U.S. Pat. No. 2,877,520. It will be appreciated that such connector plates are applied where necessary and that the number of elements forming the front or lower rear rails may be more or less than as specifically illustrated herein. The furniture frame 10 also includes an upright stump 26 at opposite ends and secured to the ends of the front rail and forward ends of the side rails 20. Arms 28 connect the tops of stumps 26 and the end uprights 18 of the rear frame RF.

Figures 4, 4A, 4B:
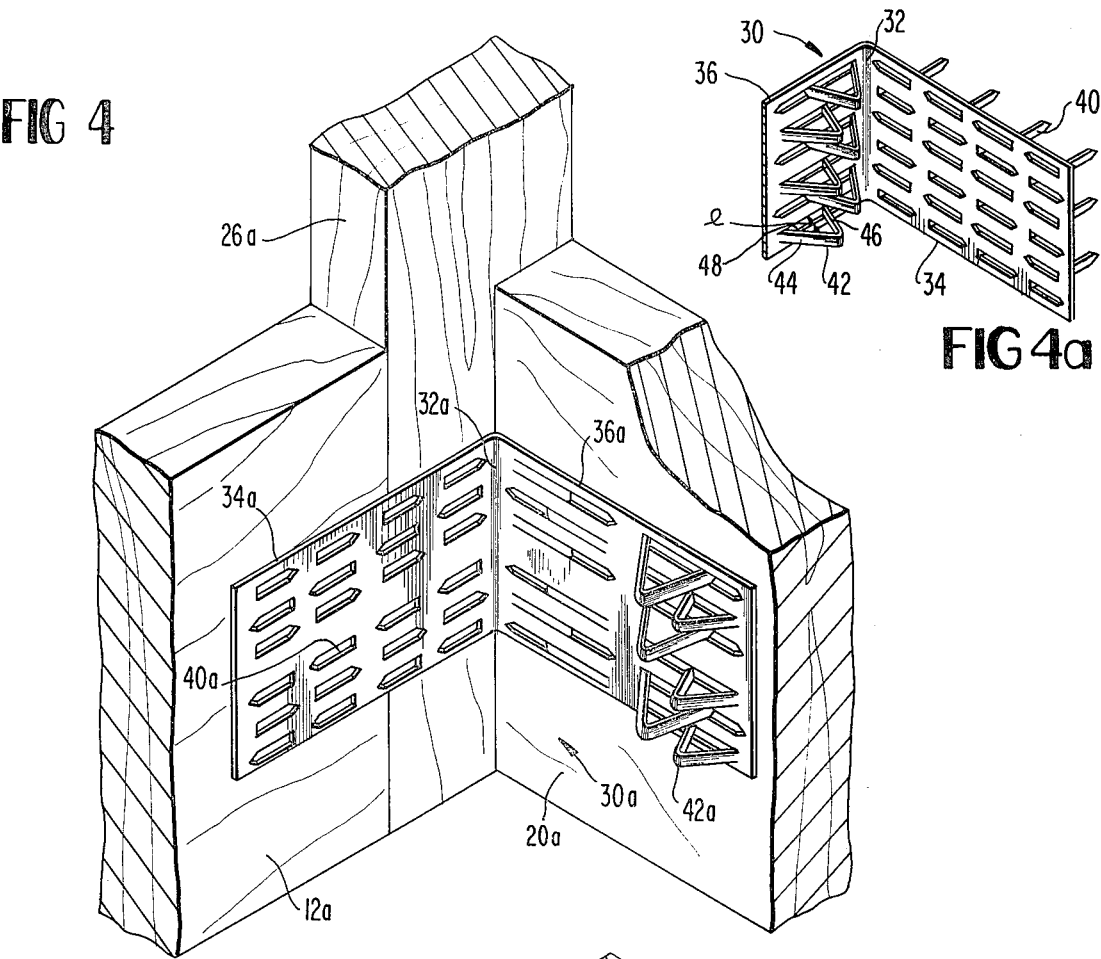
FIG. 4 is a fragmentary view of the inside corner of a joint with the members of the joint being joined by an inside fastener constructed in accordance with the present invention.
FIG. 4a is a reduced fragmentary perspective view of the fastener employed in the joint in FIG. 4.
FIG. 4b is an outside fragmentary perspective view of the joint illustrated in FIG. 4 with the members of the joint being joined by an outside fastener constructed in accordance with the present invention.
Figure 16A:
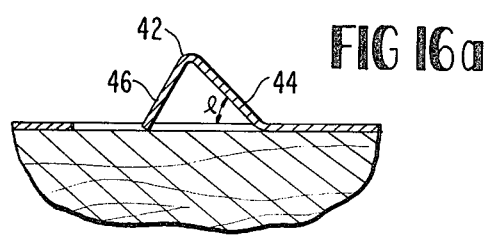
FIGS. 16a and 16b are fragmentary cross sectional views of a bent tooth, respectively prior to and after embedment into a wooden member.

The various joints disclosed in FIG. 1, for example, between the stump and side and/or front rail, between the side and/or rear rail and upright 18, between each stretcher 22 and the front or rear rail and between the uprights 18 and the upper rear rail 14, may be formed utilizing one of the various types of fasteners disclosed herein as follows. Basic to the fastener of the present invention is a fastener plate having two or more angularly related plate portions and two types of teeth carried by the plate portions. This is more particularly disclosed by reference, particularly to an embodiment of the fastener hereof, for example as illustrated in FIG. 4a. In FIG. 4a, there is disclosed a sheet metal plate 30 bent about a fold line 32 to define two angularly related plate portions 34 and 36, with each plate portion having one of two types of teeth struck therefrom. The teeth struck from the plate portion 34 comprise elongated nail-like teeth 40 struck to extend normal to plate portion 34 and on one side thereof. In the illustrated form, the teeth are struck in longitudinally extending rows with the slots left in the plate in each row extending from the teeth struck therefrom in like directions. The slots in adjacent rows extend from the teeth in opposite directions. The tooth configuration and pattern of teeth in the plate may be of the type described and illustrated in my U.S. Pat. No. 2,877,520. The second group of teeth, which are struck from portions of the plate, for example portion 36, comprises a plurality of teeth 42 bent to form angularly related shank and tip portions 44 and 46, respectively. The shank portion 44 is struck to extend from the plate portion 36 on the side thereof remote from the side of the plate portion which will butt the member of the joint and to extend from the plate portion and form an included angle e therewith. (See FIG. 16a.) The tip portion 46 is bent to form an included angle with the shank portion 44 and is poised over the slot 48 left by the tooth for insertion through the slot. In this manner, the plate face on the side of plate portion 36 remote from the bent teeth 42 is flat for flush engagement against a joint member prior to tooth embedment.

With the foregoing types of teeth in mind, hereinafter referred to as straight teeth 40 or bent teeth 42, the various fasteners hereof are provided with a group of straight teeth in one plate portion with the bent teeth being provided in one or more of the angularly related plate portions. Further, any joint connection between two or more members lying in a single plane, will be joined by the plate portion 34 hereof utilizing the straight teeth 40 with the one or more angularly related members of the joint receiving the bent teeth 42. Thus, where planar frames are formed, for example from RF in FIG. 1, the fasteners are oriented such that the plate portions 34 lie in a plane parallel to the plane of the frame whereby the straight teeth 40 thereof can be simultaneously embedded in a single pressing operation.

Referring now to FIG. 4, there is illustrated a joint comprised of three joint members, for example, the side rail 20, stump 26, and front rail 12 of the furniture frame of FIG. 1. The members of the joint are joined one to the other by an inside fastener 30a comprised of a plate portion 34a and a right angularly related plate portion 36a. Plate portion 34a is provided with straight teeth 40a for embedment into the front rail 12a and stump 26a. Plate portion 36a contains bent teeth 42a, the tip portions of which are adapted for embedment into the side rail 20a. It will be appreciated that the straight teeth 40a of plate 30a are first embedded into the front rail 12a and stump 26a by a suitable press or the like. Subsequently, the tip portions of bent teeth 42a are driven through the corresponding slots for embedment into side rail 20a whereby side and front rails 20a and 12a and stump 26a are secured one to the other. It will also be appreciated that the teeth can be reversed in their location relative to the plate portions. That is, the straight teeth 40a may project from the plate portion 36a, while the bent teeth 42a may project from the plate portion 34a. In this event, the straight teeth 40a of the plate portion 36a would first be embedded into the side rail 20a, for example by a suitable press, with the tip portions 46a of the bent teeth 42a being driven through the corresponding slots for embedment into the inside face of front rail 12a and stump 26a.

In FIG. 4b, a like joint as in FIG. 4a, but at the opposite end of the frame of FIG. 1, is disclosed with a fastener 36a' joining the members one to the other. The fasteners 36a' in this form comprises generally right angularly related plate portions 34a' and 36a'. Straight teeth 40a' are provided in plate portion 34a'. Bent teeth 42a' initially project from the face of plate portion 36a' on the side thereof remote from plate portion 34a'. With this form of fastener, the teeth 40a' are first embedded into the front rail 12a' and stump 26a' along the front faces thereof by a suitable press or the like. Upon embedment, it will be appreciated that the inside face of plate portion 36a' lies flush along the side face of stump 26a' and side rail 20a' whereby the tip portions of the bent teeth 42a' can be inserted through the corresponding slots for embedment into the respective members.

Referring to FIG. 5, there is illustrated a fastener 30b for joining three angularly related members one to the other. For example, the joint may comprise another form of the juncture between the front rail 12b, stump 26b and side rail 20b. In this form, the straight teeth 40b extend from plate portion 34b for embedment into the rail 12b and stump 26b. The plate portion 34b includes an extension 50 lying in the plane of plate portion 34b and beyond plate portion 34b for supporting teeth 40b embedded into stump 26b. Plate portion 36b is provided with bent teeth 42b which initially project on the side thereof near plate portion 34b. Accordingly, after the teeth 40b of plate portion 34b are embedded into rail 12b and stump 26b, the tip portions of the bent teeth 42b in plate portion 36b are driven through the corresponding slots for embedment into side rail 20b. It will be appreciated that the plate portions 36b could be provided with the straight teeth while the plate portions 34b and 50 are provided with the bent teeth.

The joint illustrated in FIG. 5 is formed by a fastener applied along the inside faces, whereas the similar joint disclosed in FIG. 5A is formed by a fastener applied to the external faces. In FIG. 5A, the plate 30b' is comprised of right angularly related plate portions 34b' and 36b'. In this form of fastener, plate portion 34b' has a coplanar extension 52 which extends beyond the upper edge of plate portion 36b'. The straight teeth 40b' extend from plate portions 34b' and 52 for embedment into front rail 12b' and stump 26b'. The bent teeth 42b' in plate portion 36b' initially project on the side of portion 36b' remote from plate portions 34b' and 52. After the straight teeth of plate portions 34b' and 52 have been embedded into the front rail 12b' and stump 26b', the tips of the bent teeth 42b' are driven through the corresponding slots for embedment into the side rail 20b' whereby the members 12b', 20b', and 26b' are secured one to the other.

Referring now to FIG. 6, there is illustrated a fastener 30c for joining the members of a joint one to the other. For example, this joint may comprise front rails 12c, stump 26c, side rail 20c and an upright 60 butted at its lower end against the upper edge of side rail 20c and disposed behind stump 26c. The fastener 30c includes a plate portion 34c bent substantially normal to a plate portion 36c. Plate portion 34c extends sufficiently to lap inside end face portions of the end of the front rail 12c and the lower end of stump 26c. Plate portion 36c extends vertically sufficient to lap the inside end faces of side rail 20c and upright 60. Plate portion 34c is provided with straight teeth 40c struck therefrom to project on the side of plate portion 34c remote from plate portion 36c for embedment into the inside faces of front rail 12c and stump 26c. Plate portion 36c is provided with bent teeth 42c struck to initially project on the side of plate portion 36c near plate portion 34c. To employ fastener 30c in the joint, the straight teeth 40c are first embedded into the joint members 12c and 26c joining them one to the other. After members 20c and upright 60 are butted one to the other and against the outside face of plate portion 36c, the tips of bent teeth 42c are driven through the corresponding slots for embedment into the respective members 20c and 26c whereby joint members 12c, 26c, 20c and 60 are secured one to the other.

In FIG. 7, there is illustrated a joint comprised of three generally orthogonally related joint members, for example, a stump 26d, arm 28d, and an arm support 68 of a like furniture frame as illustrated in FIG. 1. The joint members are secured one to the other by a fastener 30d applied to the inside faces thereof. The fastener 30d includes a plate portion 34d and a plate portion 36d bent substantially normal to the plane containing plate portion 34d. Plate portion 38d is bent substantially normal to plate portions 34d and 36d whereby the fastener includes generally orthogonally related plate portions 34d, 36d, and 38d. Plate portion 34d is provided with straight teeth 40d struck to project on a side remote from plate portions 36d and 38d for embedment into joint member 26d. Plate portions 36d and 38d each have a plurality of bent teeth 42d struck to initially project on the sides thereof near plate portion 34d. To form the joint, the straight teeth 40d of plate portion 34d are embedded into the inside face of stump 26d. The tips of bent teeth 42d in both plate portions 36d and 38d are then driven through the corresponding slots for embedment into the respective joint members 28d and 68 whereby inside fastener 30d secures the orthogonally related members 26, 28, and 68 one to the other.

Referring now to FIG. 8, there is illustrated a joint comprised of generally orthogonally related members, for example, the joint called out in FIG. 1 at FIG. 8 comprised of upright 18e, side rail 20e, and lower rear rail 16e. The members of the joint are secured one to the other by a fastener 30e including a plate portion 34e bent substantially normally to a plate portion 36e. Plate portion 38e is bent substantially normal to plate portion 36e and plate portion 39e is bent substantially normal to plate portions 34e and 36e whereby plate portions 38e and 39e are substantially coplanar. Plate portion 34e is provided with straight teeth 40e struck to project from the side thereof near plate portion 36e for embedment into a side face of upright 18e. Plate portion 36e is provided with bent teeth 42e struck to initially project on the side of plate portion 36e remote from plate portion 34e. Each of plate portions 38e and 39e are provided with bent teeth 42e struck to initially project on the side of plate portions 38e and 39e near plate portions 36e and 34e, respectively. To apply this fastener to the joint, the straight teeth 40e of plate portion 34e are embedded into a side face of upright 18e, with the face of plate portion 36e butting against the other side face of upright 18e. After the plate portions 38e and 39e and joint members 16e and 20e are butted one against the other, the tips of bent teeth 42e in each of plate portions 36e, 38e, and 39e are driven through the corresponding slots for embedment into the upright 18e lower rear rail 16e, and side rail 20e, respectively, whereby the orthogonally related members of the joint are finally secured one to the other.

Referring to FIG. 8a, two joint members of the orthogonally related members of a joint may be joined one to the other with the third joint member being joined to the two joint members by other means, not shown. In this form, the plate portions 34e', 36e', and 39e' are similarly oriented and are provided with like teeth as described in connection with the fastener disclosed in FIG. 8. However, this form of fastener includes a plate portion 70e' bent to lie generally normal relative to plate portion 39e' and also lie in a like plane with plate portion 36e'. Plate portion 70e' is provided with bent teeth 42e' struck to initially project on the side thereof remote from plate portion 39e'. The fastener 30e' is utilized similarly as the fastener 30e of FIG. 8 with the tips of the bent teeth 42e' in plate portion 70e' being driven through the corresponding slots for embedment into member 20e' whereby upright 18e' and rail 20e' are secured one to the other with rail 16 being secured to the members 18 and 20 by other means not shown.

Referring now to FIG. 9, there is illustrated a joint, for example, the joint between upper rear rail 14f and an end upright 18f, the members of which joint are secured one to the other by a fastener 30f. Fastener 30f includes a plate portion 34f and a plate portion 36f bent to lie substantially normal one to the other. Plate portion 38f is bent to lie substantially normal to planes containing portions 36f and 34f whereby orthogonally related plate portions are provided. Plate portion 34f is provided with straight teeth 40f for embedment into the joint members 14f, whereas plate portions 36f and 38f are provided with bent teeth 42f struck to initially project on their near sides. To apply fastener 30f, the straight teeth 40f are first embedded into the joint members 14f. The inside faces of the plate portions 36f and 38f thus lie flush with the inside faces of members 14f and 18f, respectively. The tips of bent teeth 42f are then driven through the corresponding slots for embedment into members 14f and 18f whereby fastener 40f secures members 14f and 18f one to the other.

In FIG. 10, there is illustrated a joint comprised of two joint members, for example, a lower rear rail 16g and upright 18g of a like furniture frame as illustrated in FIG. 1. The joint members are secured one to the other by a fastener 30g including a plate portion 34g and a plate portion 36g bent to lie substantially normal to plate portion 34g. Plate portion 34g is generally L-shaped with plate portion 36g being bent back from the upper portion of plate portion 34g. Plate portion 34g is provided with straight teeth 40g struck to project on the same side thereof as plate portion 36g for embedment into both rail 16g and upright 18g. Plate portion 36g is provided with a plurality of bent teeth 42g struck to initially project on the side thereof remote from joint member 18g. To form the joint, the straight teeth 40g of plate portion 34g are embedded into the inside faces of rail 16g and upright 18g. The tips of bent teeth 42g in plate portion 36g are then driven through the corresponding slots for embedment into a side face of upright 18g whereby fastener 30g secures lower rear rail 16g and upright 18g one to the other.

In FIG. 11, there is illustrated a joint comprised of a pair of joint members, for example, a lower rear rail 16h and a stretcher 22h of a like furniture frame as illustrated in FIG. 1. The joint members are secured one to the other by a fastener 30h including a plate portion 34h and a plate portion 36h bent substantially normal to plate portion 34h. Plate portion 34h is provided with straight teeth 49h struck to project on a side thereof remote from plate portion 36h for embedment into lower rear rail 16h. Plate portion 36h is provided with a plurality of bent teeth 42h struck to initially project on the side thereof remote from stretcher 22h. To apply the fastener to the joint, the straight teeth 40h of plate portion 34h are embedded into the inside face of lower rear rail 16h. The tips of bent teeth 42h in plate portion 36h are then driven through the corresponding slots for embedment into the side face of stretcher 22h whereby fastener 30h secures the lower rear rail 16h and the stretcher 22h one to the other.

Figure 12:
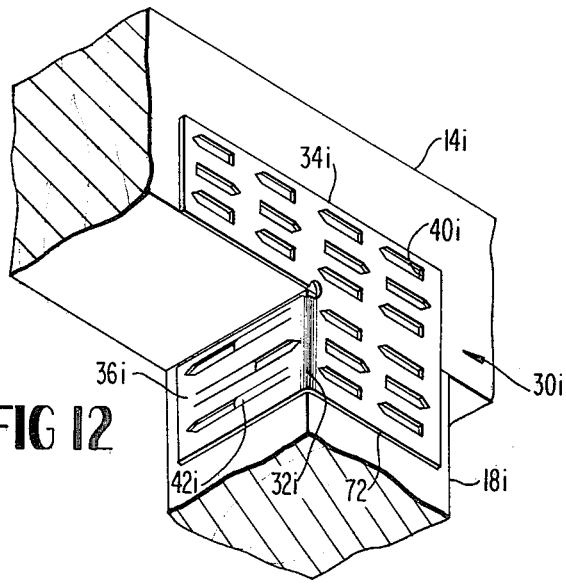

Referring now to FIG. 12, there is illustrated a joint comprised of coplanar joint members, for example, an upright 18i and the upper rear rail 14i of a like furniture frame as illustrated in FIG. 1. The joint members are secured one to the other by a fastener 30i including a plate portion 34i and a plate portion 36i bent substantially normal to the plane containing plate portion 34i. Plate portion 34i has a lower leg 72 from which the plate portion 36i projects about a fold line 32i. Plate portion 34i is provided with straight teeth 40i struck to project on a side thereof near plate portion 36i for embedment into the inside faces of joint members 14i and 18i. Plate portion 36i is provided with a plurality of bent teeth 42i struck to initially project on the side thereof remote from upright 18i. To apply the fastener to the joint, the straight teeth 40i of plate portion 34i are embedded into the inside face of rail 14i and upright 18i. The tips of bent teeth 42i in plate portion 46i are then driven through the corresponding slots for embedment into the side face of upright 18i whereby fastener 30i secures joint members 14i and 18i one to the other.

Figure 13:
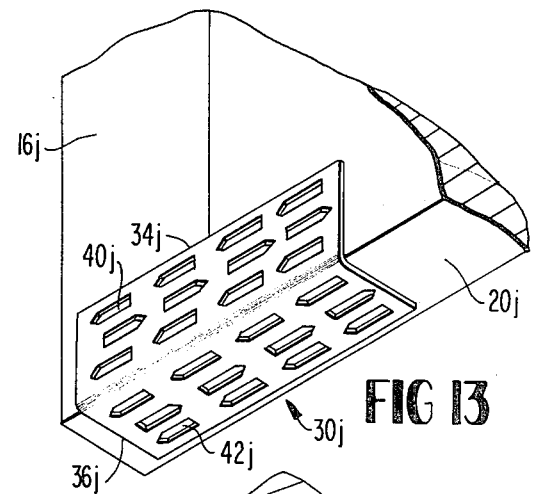

Referring now to FIG. 13, there is illustrated a joint comprised of two angularly related members, for example, a side rail and lower rear rail of a like furniture frame as illustrated in FIG. 1. The joint members are secured one to the other by a fastener 30j including a plate portion 34j and a plate portion 36j bent substantially normal to the plane containing plate portion 34j. Plate portion 34j is provided with straight teeth 40j struck to project on a like side as plate portion 36j for embedment into the side faces of joint members 16j and 20j. Plate portion 36j is provided with a plurality of bent teeth 42j struck to initially project on the side thereof remote from plate portion 34j. To apply fastener 34j to the joint, the straight teeth 40j of plate portion 34j are embedded into the outside faces of joint members 16j and 20j. The tips of bent teeth 42j in plate portion 36j are then driven through the corresponding slots for embedment through the lower surfaces of joint members 16j and 20j whereby fastener 30j secures joint members 16j and 20j one to the other.

Figure 14:
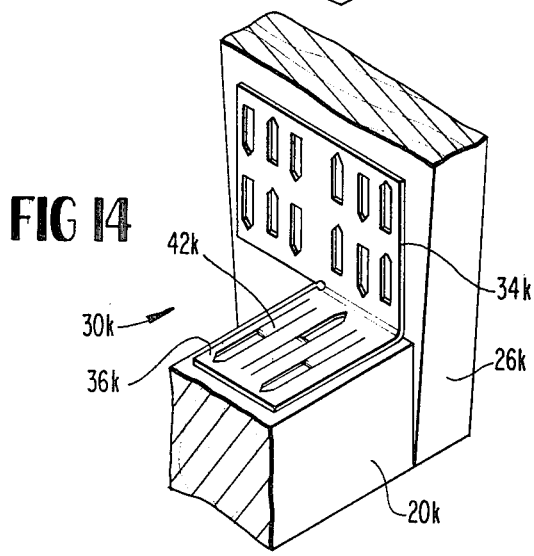

Referring now to FIG. 14, there is illustrated a joint comprised of two angularly related joint members, for example, a stump 26k and a side rail 20k of a like furniture frame as illustrated in FIG. 1. The joint members are secured one to the other by a fastener 30k including a plate portion 34k and a plate portion 36k bent substantially normal to the plane containing plate portion 34k. Plate portion 34k is provided with straight teeth 40k struck to project on a side thereof remote from plate portion 36k for embedment through the inside face of stump 26k. Plate portion 36k is provided with a plurality of bent teeth 42k struck to initially project on the side thereof near plate portion 34k. To apply fastener 30k to the joint, the straight teeth 40k of plate portion 34k are embedded through the inside face of stump 26k. The tips of bent teeth 42k in plate portion 36k are then driven through the corresponding slots for embedment through the upper face of side rail 20k whereby fastener 30k secures side rail 20k to stump 26k.

Figure 15:
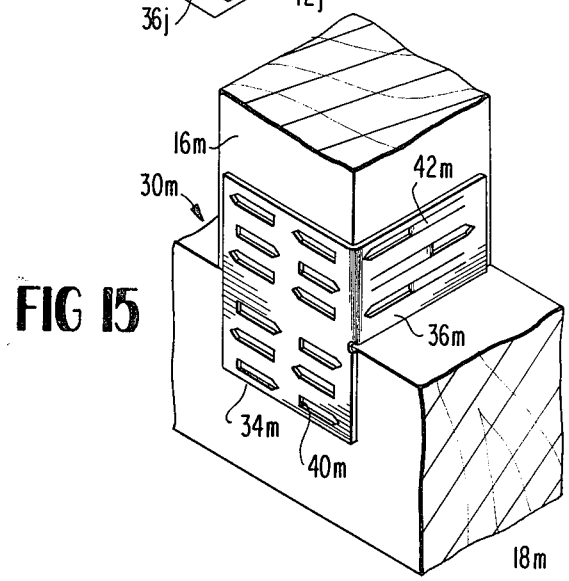

Referring now to the joint illustrated in FIG. 15, there is disclosed a fastener 30m for joining right angularly related joint members, for example, a lower rear rail 16m and an upright 18m of a like furniture frame as illustrated in FIG. 1. The fastener 30m includes a plate portion 34m and a plate portion 36m bent substantially normal to the plane containing plate portion 34m. Plate portion 36m is reduced in width as to extend from the upper portion of plate portion 34m. Plate portion 34m is provided with straight teeth 40m struck to project on a side thereof near plate portion 36m for embedment into the inside faces of joint members 16m and 18m. Plate portion 36m is provided with a plurality of bent teeth 42m struck to initially project on the side thereof remote from plate portion 34m. To apply fastener 30m to the joint, the straight teeth 40m of plate portion 34m are embedded into the inside faces of rail 16m and upright 18m. The tips of bent teeth 42m in plate portion 36m are then driven through the corresponding slots for embedment through a side face of upright 18m whereby fastener 30m secures the joint members 16m and 18m one to the other.

Figure 17:
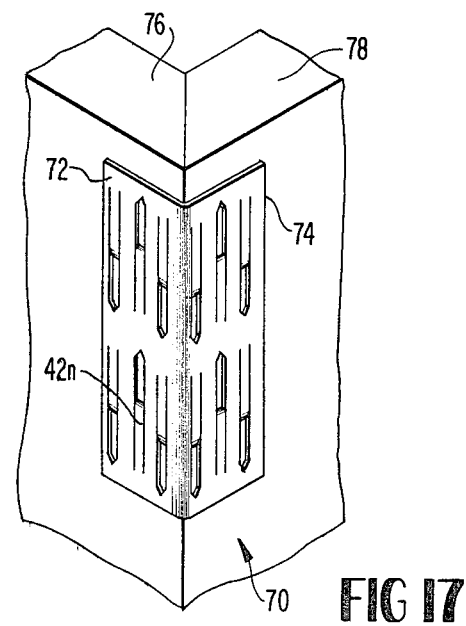
FIG. 17 is a fragmentary perspective view of a miter joint utilizing another form of fastener hereof.
Figure 16B:
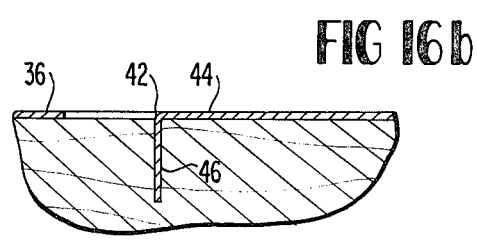

It will be appreciated from the foregoing that a family of plates, each with two or more plate portions containing straight teeth in one of the plate portions and angularly related teeth in the other plate portion or portions, can be provided to secure the members of any particular wooden joint. The present invention, as illustrated in FIG. 17, also contemplates a plate 70 having angularly related plate portions 72 and 74 for connecting angularly related joint members 76 and 78. Each plate portion 72 and 74 contains bent teeth 42n of the type illustrated in FIGS. 16a and 16b and which teeth 42n initially project away from the other plate portion. Upon application of the plate to the outside surfaces of the butting members 76 and 78, the tips of the teeth 42n can be driven through the associated slots and into the corresponding wooden member whereby fastener 70 secures the joint members 16m and 18m one to the other.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A fastener for joining angularly related wooden members comprising: a flat sheet metal plate bent to provide first and second planar plate portions lying in respective first and second planes intersecting one another and forming an included angle; said plate being further bent to provide a third planar plate portion lying in a third plane intersecting said first and second planes; a first group of elongated nail-like teeth struck from said one plate portion to project to one side thereof for embedment into one of the members; and a second group of elongated teeth struck from said second plate portion to project to one side thereof and leaving a plurality of elongated slots in said second plate portion, the teeth of said second group having angularly related shank and tip portions with said shank portions extending from said second plate portion to form an included angle therewith, said tip portion extending from said shank portions in a direction toward said second plate portion and poised for insertion through the slots from which the teeth are struck for embedment into the other of the members; and a third group of teeth struck from said third plate portion to project to one side thereof for embedment into a third member and leaving a plurality of slots in said third plate portion.

2. A fastener according to claim 1, wherein said third group of teeth is comprised of teeth identically configured as the teeth of one of said first and second groups of teeth.

3. A fastener according to claim 1, wherein said third group of teeth have angularly related shank and tip portions with said shank portions extending from said third plate portion to form an included angle therewith, said tip portions extending from said shank portions in a direction toward said third plate portion and poised for insertion through the slots from which the teeth are struck for embedment into the third member.

4. A fastener according to claim 3, wherein each of said plate portions lies to one side of the planes containing the other plate portions, said first group of teeth projecting from said one plate portion on the same side of said first plane as said second plate portion, said second group of teeth projecting from said second plate portion on the opposite side of said second plane as said first plate portion, and said third group of teeth projecting from said third plate portion on the same side of said third plate portion as said first and second plate portions.

5. A fastener according to claim 1, wherein said first, second and third plate portions are orthogonally related one to the other.

6. A fastener for joining angularly related wooden members comprising:

a flat sheet metal plate bent to provide first and second planar plate portions lying in respective first and second planes intersecting one another and forming an included angle, said plate portions being bent about a fold line extending generally parallel to the line of intersection of said planes, one of said plate portions having a length in the direction of said fold line greater than the length of the other of said plate portions in a like direction; a first group of elongated nail-like teeth struck from said one plate portion to project to one side thereof for embedment into one of the members and leaving a plurality of elongated slots in said one plate portion; and a second group of elongated teeth struck from said second plate portion to project to one side thereof and leaving a plurality of elongated slots in said second plate portion, the teeth of said second group having angularly related shank and tip portions with said shank portions extending from said second plate to form an included angle therewith, said tip portions extending from said shank portions in a direction toward said second plate portion and poised for insertion through the slots from which the teeth are struck for embedment into the other of the members.

7. A fastener according to claim 6, wherein said first and second groups of teeth project from opposite sides of said plate.

8. A fastener according to claim 6, wherein the slots left in the plate by said first and second groups of teeth extend along said plate portions in parallel directions.

9. A fastener according to claim 6, wherein the slots left in the plate by the group of teeth struck from one of said plate portions extend in a direction parallel to said fold line.

10. Apparatus for forming a joint comprising:

a wooden member adapted for connection with second and third wooden members, a flat sheet metal plate bent to provide first and second planar plate portions lying in respective first and second planes perpendicularly intersecting one another and forming an included right angle; said plate being further bent to provide a third planar plate portion lying in a third plane perpendicularly intersecting said first and second planes; a first group of elongated nail-like teeth struck from said one plate portion to project to one side thereof and embedded into said wooden member, said teeth leaving a plurality of elongated slots in said first plate portion; a second group of elongated teeth struck from said second plate portion to project to one side thereof and leaving a plurality of elongated slots in said second plate portion, the teeth of said second group having angularly related shank and tip portions with said shank portions extending from said second plate to form an included angle therewith, said tip portions extending from said shank portions in a direction toward said second plate portion and poised for insertion through the slots from which the teeth are struck for embedment into a second wooden member; and a third group of teeth struck from said third plate portion to project to one side thereof for embedment into a third member and leaving a plurality of slots in said third plate portion.

11. Apparatus for forming a joint comprising:

a wooden member adapted for connection with a second wooden member, a flat sheet metal plate bent to provide first and second planar plate portions lying in respective first and second planes intersecting one another and forming an included angle, said plate portions are bent about a fold line extending generally parallel to the line of intersection of said planes, one of said plate portions having a length in the direction of said fold line greater than the length of the other of said plate portions in a like direction; a first group of elongated nail-like teeth struck from said one plate portion to project to one side thereof and embedded into said wooden member, said teeth leaving a plurality of elongated slots in said one plate portion; and a second group of elongated teeth struck from said second plate portion to project to one side thereof and leaving a plurality of elongated slots in said second plate portion, the teeth of said second group having angularly related shank and tip portions with said shank portions extending from said second plate to form an included angle therewith, said tip portions extending from said shank portions in a direction toward said second plate portion and poised for insertion through the slots from which the teeth are struck for embedment into a second wooden member.

12. Apparatus according to claim 11, wherein the slots left in the plate by said first and second groups of teeth extend along said plate portions in parallel directions.

13. Apparatus according to claim 11, wherein the slots left in the plate by the group of teeth struck from one of said plate portions extend in a different direction parallel to said fold line.

14. A joint comprising:

first, second and third angularly related wooden members; a flat sheet metal plate bent to provide first and second planar plate portions lying in respective first and second planes perpendicularly intersecting one another and forming an included right angle; said plate being further bent to provide a third planar portion lying in a third plane perpendicularly intersecting said first and second planes; a first group of elongated nail-like teeth struck from said one plate portion to project to one side thereof and embedded into one of the members, said teeth leaving a plurality of elongated slots in said one plate portion; a second group of elongated teeth struck from said second plate portion to project to one side thereof and leaving a plurality of elongated slots in said second plate portion, the teeth of said second group having angularly related shank and tip portions, said tip portions extending from said shank portions and embedded into said second wooden member, said shank portions lying substantially in said second plane when said tip portions are fully embedded into said second member; and a third group of teeth struck from said third plate portion to project to one side thereof and being embedded in said third member and leaving a plurality of slots in said third plate portion.

15. A joint comprising:

first and second angularly related wooden members; a flat sheet metal plate bent to provide first and second planar plate portions lying in respective first and second planes intersecting one another and forming an included angle, said plate portions being bent about a fold line extending generally parallel to the line of intersection of said planes, one of said plate portions having a length in the direction of said fold line greater than the length of the other of said plate portions in a like direction, a first group of elongated nail-like teeth struck from one plate portion to project to one side thereof and embedded into one of the members, said teeth leaving a plurality of elongated slots in said one plate portion; a second group of elongated teeth struck from said second plate portion to project to one side thereof and leaving a plurality of elongated slots in said second plate portion, the teeth of said second group having angularly related shank and tip portions, said tip portions extending from said shank portions and embedded into said second wooden member, said shank portions lying substantially in said second plane when said tip portions are fully embedded into said second member.

* * * * *